United States Patent
Sengodan

(10) Patent No.: US 11,109,460 B2
(45) Date of Patent: Aug. 31, 2021

(54) INTERLEAVED BOOST CONVERTER WITH CAPACITIVE MULTIPLIER FOR LED DRIVE

(71) Applicant: Goodrich Corporation, Charlotte, NC (US)

(72) Inventor: Rajkumar Sengodan, Tamilnadu (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/874,756

(22) Filed: May 15, 2020

(65) Prior Publication Data

US 2020/0367337 A1 Nov. 19, 2020

(30) Foreign Application Priority Data

May 15, 2019 (IN) .............................. 201911019414

(51) Int. Cl.
*H05B 45/38* (2020.01)
*H02M 3/142* (2006.01)

(52) U.S. Cl.
CPC ............ *H05B 45/38* (2020.01); *H02M 3/142* (2013.01)

(58) Field of Classification Search
CPC .. H02M 7/5387; H02M 1/4216; H02M 3/158; H02M 1/44; H02M 2001/0077; H02M 7/72; H02M 3/156; H02M 1/12; H02M 1/32; H02M 7/48; H02M 1/4233; H02M 3/1582; H02M 7/217; H02M 7/23; H02M 1/10; H02M 1/36; H02M 3/157; H02M 3/1588; H02M 5/4585; H02M 7/125
(Continued)

(56) References Cited

U.S. PATENT DOCUMENTS 7,403,400 B2 7/2008 Stanley
9,929,654 B2 3/2018 Ferdowsi et al.
(Continued)

FOREIGN PATENT DOCUMENTS

EP 2600513 A1 6/2013

OTHER PUBLICATIONS

Alzahrani et al., "A Family of Scalable Non-Isolated Interleaved DC-DC Boost Converters With Voltage Multiplier Cells", IEEE Access, vol. 7, Jan. 9, 2019, pp. 11707-11721.
(Continued)

*Primary Examiner* — Wei (Victor) Y Chan
(74) *Attorney, Agent, or Firm* — Cantor Colburn LLP

(57) ABSTRACT

Systems and methods for operating a light-emitting diode (LED) driver circuit are provided. Aspects include providing an interleaved boost converter including a first boost converter and a second boost converter, the second boost converter interleaved with the first boost converter, operating a first switching element to control a first boost convertor in the LED driver circuit, wherein the first boost convertor is in an ON state responsive to the first switching element being in an ON state, operating a second switching element to control a first boost convertor in the LED driver circuit, wherein the second boost convertor is in an ON state responsive to the first switching element being in an ON state, providing a set of LEDs, wherein the interleaved boost converter provides a step-up voltage to the set of LEDs.

17 Claims, 2 Drawing Sheets

(58) Field of Classification Search
USPC .......................................... 323/271, 282, 225
See application file for complete search history.

(56) References Cited

U.S. PATENT DOCUMENTS

| | | | | |
|---|---|---|---|---|
| 9,973,089 | B1* | 5/2018 | Terasawa | H02M 1/42 |
| 2007/0138971 | A1* | 6/2007 | Chen | H05B 39/045 |
| | | | | 315/209 R |
| 2009/0184668 | A1 | 7/2009 | Mednik et al. | |
| 2012/0133299 | A1* | 5/2012 | Capodivacca | H05B 45/46 |
| | | | | 315/297 |
| 2015/0214848 | A1* | 7/2015 | Umetani | H02M 7/103 |
| | | | | 363/21.12 |
| 2020/0375002 | A1* | 11/2020 | Das | H05B 45/382 |

OTHER PUBLICATIONS

Alzahrani et al., "An Interleaved Non-Isolated DC-DC Boost Converter With Diode-Capacitor Cells", 2017 IEEE 6th International Conference on Renewable Energy Research and Applications, Nov. 5, 2017, pp. 216-221.

Extended European Search Report; European Application No. 20173202.1; Application Filed: May 6, 2020; Search Report dated Sep. 16, 2020; 9 pages.

\* cited by examiner

INTERLEAVED BOOST CONVERTER WITH CAPACITIVE MULTIPLIER FOR LED DRIVE

CROSS-REFERENCE TO RELATED APPLICATIONS

This application claims the benefit of Indian Patent Application number 201911019414 filed May 15, 2019, which is incorporated herein by reference in its entirety.

BACKGROUND

The present invention generally relates to light emitting diodes (LEDs), and more specifically, to circuit and method for an interleaved boost converter with capacitive multiplier for high power LED drive.

LEDs can be utilized in many power sensitive applications such as, for example, displays and low power electronic devices in aircraft lighting systems, aircraft interiors, aircraft display, landing lights, strobe lights for flashing emergency needs, automobiles, and commercial uses. However, current LED driving circuits utilizing boost converters and transformers suffer from shortages in LED drive voltages and power loss. Conventional high frequency switched boost converter/transformer based converters can face losses in power sensitive applications for LED drives, displays, non-volatile memories and low power high-voltage electronic devices in aircraft, automobiles, and consumer electronics.

SUMMARY

Embodiments of the present invention are directed to system. A non-limiting example of the system includes an interleaved boost converted including a first boost converter and a second boost converter, the second boost converter interleaved with the first boost converter, an electronic filter comprising an input and an output, wherein the input of the electronic filter is coupled to an output of the interleaved boost converter, a set of light-emitting diodes (LEDs) coupled to an output of the electronic filter, and a power source coupled to an input of the interleaved boost converter.

Embodiments of the present invention are directed to a method for operating an LED circuit. A non-limiting example of the method includes providing an interleaved boost converter including a first boost converter and a second boost converter, the second boost converter interleaved with the first boost converter, operating a first switching element to control a first boost convertor in the LED driver circuit, wherein the first boost convertor is in an ON state responsive to the first switching element being in an ON state, operating a second switching element to control a first boost convertor in the LED driver circuit, wherein the second boost convertor is in an ON state responsive to the first switching element being in an ON state, providing a set of LEDs, wherein the interleaved boost converter provides a step-up voltage to the set of LEDs.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Turning now to an overview of technologies that are more specifically relevant to aspects of the invention, LEDs can be utilized in many power sensitive applications such as, for example, displays and low power electronic devices in aircraft lighting systems, aircraft interiors, aircraft display, landing lights, strobe lights for flashing emergency needs, automobiles, and other commercial uses. However, as mentioned above, current LED driving circuits suffer from shortages in LED drive voltages and power loss.

The above-described aspects of the invention address the shortcomings of the prior art by providing an LED driving circuit with a capacitive voltage multiplier that produces a voltage output in an efficient manner. Embodiments include a circuit topology configured in an energy efficient manner where electromagnetic interference due to inductance is significantly reduced. For supply direct current (DC) power to a high-voltage load, the circuit topology utilizes power electronics including a transformer to provide voltage step-up and isolation between the input and output which turn increases weight and the size of a converter. Because of this, a voltage multiplier stage is included in the circuit topology that generates the required high-voltage.

Figure 1:
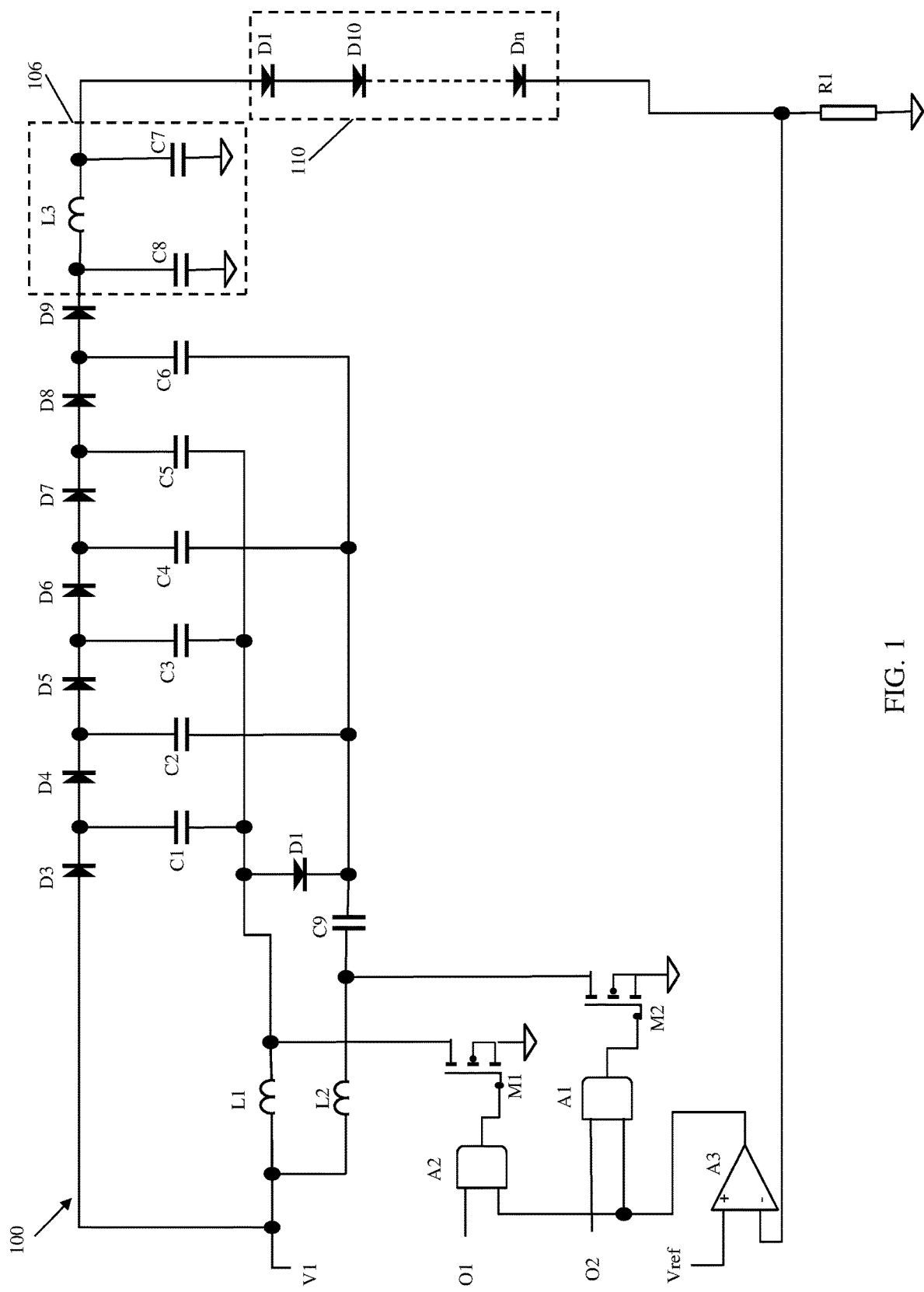
FIG. 1 depicts a block diagram of a circuit topology driving a set of light emitting diodes according to one or more embodiments.

An interleaved boost with capacitive multiplier for high voltage and lower ripple applications is provided which require high voltage due to the structure having fewer components. This topology includes insignificant switching loss and the ability to supply a load current without significant ripple. Additionally, switching the high voltage through capacitive modes does not result in efficiency loss. FIG. 1 depicts a circuit topology for an LED driving circuit according to one or more embodiments. The LED driving circuit 100 includes two pulse generators (O1, O2) and a constant voltage source V1 that are utilized to operate the boost and capacitor switches. The interleaved boost converters are configured to work 180 degrees out of phase with each other because the capacitive multiplier will transfer energy from one to another effectively in this LED driving circuit 100. The duty cycle for the two pulse generators (O1, O2) is maintained some for both of the boost converters; therefore if boost converter 1 (i.e., C1, C3, C5) is operated at 40% duty cycle, for example, then boost converter 2 (i.e., C2, C4, C6) consistently maintains to be the same duty cycle. The LED driving circuit 100 includes switches M1, M2 which, in some embodiments, are n-channel metal-oxide-semiconductor field-effect transistors (MOSFETs). The LED driving circuit 100 also includes comparator A3 and two-input AND logic gates A1, A2. The comparator A3 senses the current feedback on the set of LEDs 110 and cuts off the switch drive when sense resistor R1 exceeds a threshold voltage (Vref). This cut-off occurs because the comparator A3 output when the Vref is exceeded will be a low or '0' output to the AND logic gates A1, A2 causing their output to be low and, thus, switches M1, M2 will be in an 'off' state. During lower luminance of LED operation, only lesser current is required causing switch M2 to be kept permanently 'off' and switch M1 operates in boost mode. This allows less electromagnetic interference and improves the efficiency by reducing switching losses.

In one or more embodiments, the LED driving circuit 100 includes voltage source V1 which provides a forward bias for the diode chain to be in a conducting state and these diodes (D3 ... D9) are connected to one end of the capacitors (C1, C2, ..., C6). While the illustrated example shows a total of six (6) capacitor stages, in one or more embodiments, any number of capacitor stages can be utilized based on the output load. Voltage source V1 and the boost converter output will charge the capacitors at each switching cycle. In one or more embodiments, the voltage source V1 is equal to 10V. For the M1 switch operation, inductor L1 will store energy when M1 switch is 'On' and when M1 switch is 'Off' the voltage is transferred to one end of C1, C3, and C5 capacitor nodes. During M2 switching operation, inductor L2 will store energy when M2 is 'On' and then the voltage is transferred to one end of C2, C4, C6 capacitor nodes when switch M2 is 'Off'. This interleaving boost topology will retain higher efficiency due to load current sharing between two inductors and reduced switching loss; thereby the converter can be operated at lower frequency rather than at higher frequency as compared to utilizing a single boost converter.

In one or more embodiments, diode D1 and capacitor C9 are implemented to operate the diode chain capacitive multiplier during slighter load conditions. Consider L1, M1 is switching; during M1off period the reference voltage node of C1, C3, C5 will be equal to boost output voltage. During M1on period, the L1 output voltage goes to 0V. Therefore in each switching cycle the capacitor array C1, C3, C5 will be charged and discharged. When M2 is OFF, L1 output voltage is steered through D1 to C2, C4, C6 reference node. Therefore C2, C4, C6 reference node will have voltage level equivalent to the charged voltage across C9+L2+V1. Now, consider L2, M2 is switching; during M2on period, then capacitor C9 charges from the L1 output voltage and L2 is charged from V1. During M2off period V1+L2+C9 acts as boost charge pump. This principle is repeated for subsequent switching cycles. D1 will isolate the L1 circuit path from L2 (i.e., acts as steering diode charge transfer from L1 to L2 and reverse bias for L2 to L1 current path. The charging time constant of capacitor C1 to C6 depends on the amount of current supplied by the power supply V1 (power supply internal series resistance). An some embodiments, an arrangement to limit charge current can be achieved by adding a series resistor between V1 and D3. Consider that $\Delta v/\Delta t = I/C$ (volts per second equals current divided by capacitance) and the voltage will rise at a constant rate with respect to time in that $V = (I/C)*t$, where V is the voltage across each capacitor, I is the charge current, C is capacitor C1, C2, etc., and t is the switching time of M1 and M2.

In some embodiments, at an initial state, capacitor C1 will be charged from voltage source V1 with respect to a 0V through diode D3. Capacitor C1 will transfer voltage to capacitor C2 through diode D4. Then capacitor C2 will transfer voltage to capacitor C3 through diode D5. Capacitor C3 will then transfer voltage to capacitor C4 through diode D6. Capacitor C4 will transfer voltage to capacitor C5 through diode D7. Capacitor C5 will transfer voltage to capacitor C6 through diode D8. And capacitor C6 will transfer voltage to capacitor C7 through diode D9. In a subsequent cycle, capacitor C7 will output the required load voltage. The output voltage in this chain will be equal to the voltage across capacitor C6 minus the voltage drop for the last diode in series.

In one or more embodiments, an LC pi-filter 106 at the output of the interleaved boost convertors is implemented to reduce voltage and current ripple content for the power LED drive. This allows for providing almost constant voltage for LED drive to reduce LED flickering and increase reliability of LED failures. The cutoff frequency (Fc) can be calculated as $Fc = 1/(\pi * \sqrt{(L*C)})$ Hz.

In one or more embodiments, a set of LEDs 110 is being driven by the LED driver circuit 100. Consider if the set of LEDs 110 included a total of 39 cool-white power LEDs in series. With a minimum forward bias for each diode of 3.2V having an average current of 100 mA and a maximum forward bias of 3.85V having average current of 1500 mA. The set of LEDs 110 can be operated within this region for minimum to maximum luminance. At the single operated boost converter stage (L1, M1) will tend to increase the output voltage until the set of LEDs 110 gets into forward bias and the output current is minimum due to a single converter. Further, the peak switching voltage will be high enough to deliver the required voltage for LED conduction, therefore the current will be minimum in the operating region.

In one or more embodiments, when the interleaving boost converter is operated (L1, M1, L2, M2) then the forward bias voltage is increased further in the operating region. Consecutively, the forward current is increased linearly within the LED operating characteristics with the applied voltage which increases the luminance of the set of LEDs 110. The current is shared between two boost converters which reduces the peak switching voltage and outputs more current as compared to a single stage boost converter. The duty cycle of the boost converter is varied to obtain minimum and maximum luminance. The switching frequency of the converter is varied to obtain optimal switching loss depending on the number of LED arrays and the current consumption of the LED arrays.

Figure 2:
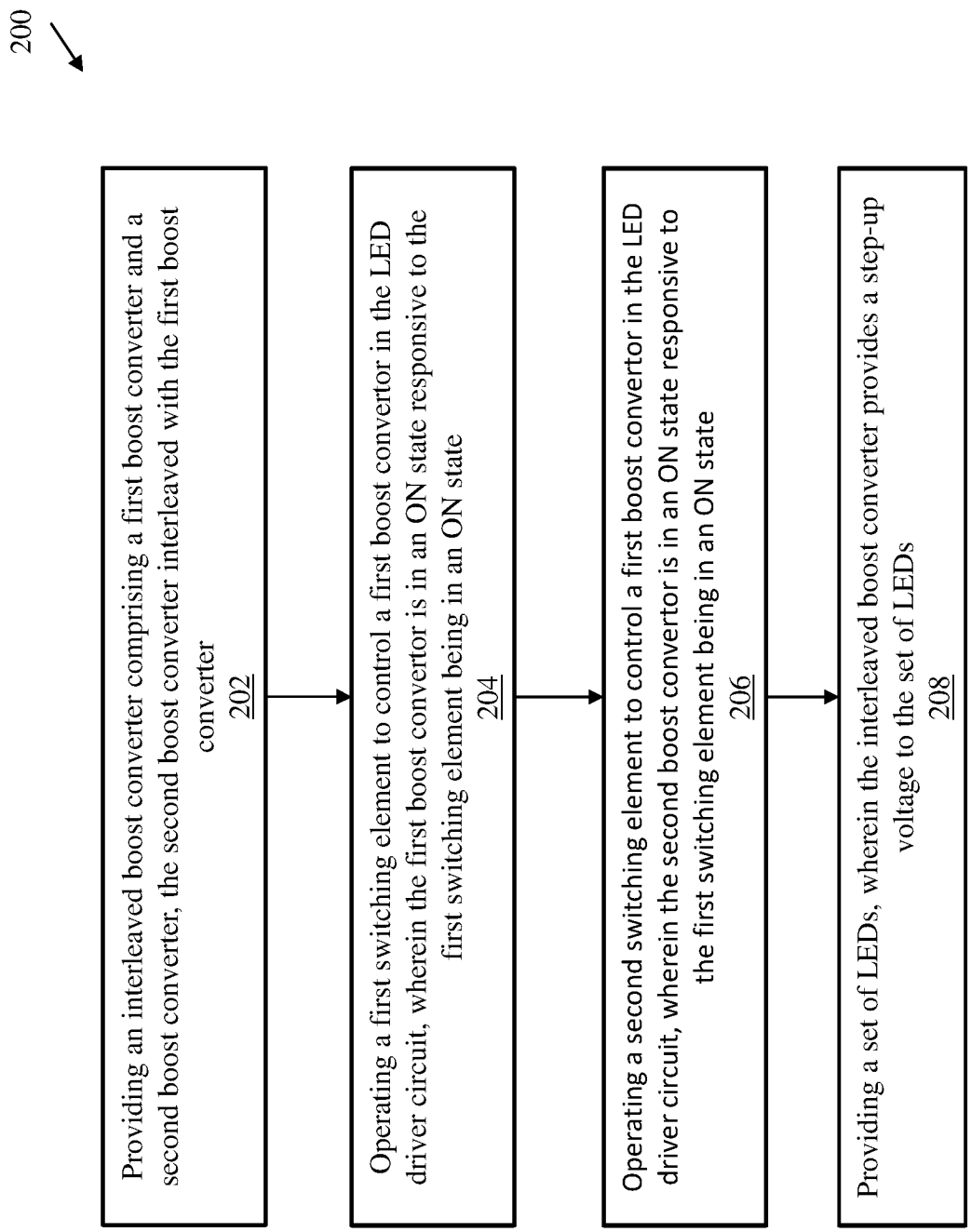
FIG. 2 depicts a block diagram of a method for operating an LED circuit according to one or more embodiments.

FIG. 2 depicts a flow diagram of a method for operating an LED driver circuit according to one or more embodiments. The method 200 includes providing an interleaved boost converter comprising a first boost converter and a second boost converter, the second boost converter interleaved with the first boost converter, as shown in block 202. At block 204, the method 200 includes operating a first switching element to control a first boost convertor in the LED driver circuit, wherein the first boost convertor is in an ON state responsive to the first switching element being in an ON state. Also, the method 200 includes operating a second switching element to control a first boost convertor in the LED driver circuit, wherein the second boost convertor is in an ON state responsive to the first switching element being in an ON state, as shown in block 206. And at block 208, the method 200 includes providing a set of LEDs, wherein the interleaved boost converter provides a step-up voltage to the set of LEDs.

Additional processes may also be included. It should be understood that the processes depicted in FIG. 2 represent illustrations, and that other processes may be added or existing processes may be removed, modified, or rearranged without departing from the scope and spirit of the present disclosure.

Various embodiments are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
    an interleaved boost converted comprising:
        a first boost converter;
        a second boost converter, the second boost converter interleaved with the first boost converter; and
        an electronic filter comprising an input and an output, wherein the input of the electronic filter is coupled to an output of the interleaved boost converter;
        a set of light-emitting diodes (LEDs) coupled to an output of the electronic filter;
        a power source coupled to an input of the interleaved boost converter;
        a first control circuit configured to operate a first switching element, wherein the first switching element controls operation of the first boost converter; and
        a second control circuit configured to operate a second switching element, the second switching element controlling operation of the second boost converter;
        a third control circuit configured to operate the first control circuit and the second control circuit, wherein the third control circuit comprises:
            a comparator circuit comprises an inverting input and a non-inverting input;
            wherein the inverting input is coupled to a feedback signal, wherein the feedback signal comprises a voltage value taken from a sense resistor in series with the set of LEDs; and
            wherein the non-inverting input is coupled to a threshold voltage.

2. The system of claim 1, wherein the feedback signal comprises voltage across a resistor in series with the set of LEDs.

3. The system of claim 1, wherein the first control circuit comprises:
    a first AND logic gate comprising a first input and a second input;
    wherein the first input comprises a first oscillation signal from a first oscillator; and
    wherein the second input comprises an output of the comparator circuit.

4. The system of claim 1, wherein the second control circuit comprises:
    a second AND logic gate comprising a third input and a fourth input;
    wherein the third input comprises a second oscillation signal from a second oscillator; and
    wherein the fourth input comprises an output of the comparator circuit.

5. The system of claim 1, further comprising:
a capacitance multiplier coupled to the first boost converter and the second boost converter.

6. The system of claim 5, wherein the capacitance multiplier comprises a diode and a capacitor.

7. The system of claim 2, wherein the first boost converter comprises an inductor, at least one diode, and at least one capacitor.

8. The system of claim 7, wherein the first boost converter is in an ON state responsive to the first switching element being in an ON state.

9. The system of claim 7, wherein the first boost converter is in an OFF state responsive to the first switching element being in an OFF state.

10. The system of claim 2, wherein the second boost converter comprises an inductor, at least one diode, and at least one capacitor.

11. The system of claim 10, wherein the second boost converter is in an ON state responsive to the second switching element being in an ON state.

12. The system of claim 10, wherein the second boost converter is in an OFF state responsive to the second switching element being in an OFF state.

13. The system of claim 1, wherein the electronic filter comprises an LC pi-filter.

14. The system of claim 1, wherein the first switching element comprises an N-type metal oxide semiconductor field effect transistor.

15. The system of claim 1, wherein the second switching element comprises an N-type metal oxide semiconductor field effect transistor.

16. A method for operating a light emitting diode (LED) driver circuit, the method comprising:
providing an interleaved boost converter comprising:
a first boost converter; and
a second boost converter, the second boost converter interleaved with the first boost converter;
operating a first switching element to control a first boost convertor in the LED driver circuit, wherein the first boost convertor is in an ON state responsive to the first switching element being in an ON state;
operating a second switching element to control a second boost convertor in the LED driver circuit, wherein the second boost convertor is in an ON state responsive to the first switching element being in an ON state;
providing a set of LEDs, wherein the interleaved boost converter provides a step-up voltage to the set of LEDs;
providing a first control circuit configured to operate a first switching element, wherein the first switching element controls operation of the first boost converter; and
providing a second control circuit configured to operate a second switching element, the second switching element controlling operation of the second boost converter;
providing a third control circuit configured to operate the first control circuit and the second control circuit, wherein the third control circuit comprises:
a comparator circuit comprises an inverting input and a non-inverting input;
wherein the inverting input is coupled to a feedback signal; and
wherein the non-inverting input is coupled to a threshold voltage.

17. The method of claim 16, further comprising:
providing an electronic filter, wherein an output of the electronic filter is coupled to the set of LEDs; and
wherein a input of the electronic filter is coupled to an output of the interleaved boost converter.

* * * * *